United States Patent
Biazetti et al.

(10) Patent No.: US 9,229,738 B2
(45) Date of Patent: Jan. 5, 2016

(54) SOFTWARE DEVELOPMENT TOOL FOR PROVIDING USER CONTEXT INFORMATION TO IMPROVE MESSAGE QUALITY AT DEVELOPMENT TIME

(75) Inventors: Ana C. Biazetti, Research Triangle Park, NC (US); Virginia D. Hill, Durham, NC (US); Radhika Ramakrishnan, Cary, NC (US); Jeffrey T. Robke, Durham, NC (US); Latha Sivakumar, Research Triangle Park, NC (US); Mary E. Sturgeon, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 992 days.

(21) Appl. No.: 12/487,711

(22) Filed: Jun. 19, 2009

(65) Prior Publication Data
US 2010/0325540 A1   Dec. 23, 2010

(51) Int. Cl.
G06F 3/00     (2006.01)
G06F 17/28    (2006.01)
G06F 9/44     (2006.01)

(52) U.S. Cl.
CPC ............. *G06F 9/4448* (2013.01); *G06F 8/316* (2013.01); *G06F 8/38* (2013.01); *G06F 9/4443* (2013.01)

(58) Field of Classification Search
CPC ................................. G06F 3/00; G06F 17/28
USPC ........................................................ 715/708
See application file for complete search history.

(56) References Cited

U.S. PATENT DOCUMENTS

| | | | | |
|---|---|---|---|---|
| 5,416,903 | A * | 5/1995 | Malcolm | 715/703 |
| 5,974,568 | A * | 10/1999 | McQueen | 714/38.13 |
| 6,434,628 | B1 * | 8/2002 | Bowman-Amuah | 714/48 |
| 6,438,716 | B1 * | 8/2002 | Snover | 714/57 |
| 6,999,990 | B1 * | 2/2006 | Sullivan et al. | 709/205 |
| 7,346,846 | B2 * | 3/2008 | Rossi et al. | 715/705 |

(Continued)

FOREIGN PATENT DOCUMENTS

| | | |
|---|---|---|
| EP | 1603031 A2 | 12/2005 |
| EP | 1868083 A1 | 12/2007 |

OTHER PUBLICATIONS

PCT/EP2010/058044 International Search Report / Written Opinion, Aug. 11, 2010.

*Primary Examiner* — Peiyong Weng
(74) *Attorney, Agent, or Firm* — Patents on Demand P.A.; Brian K. Buchheit; Scott M. Garrett

(57) ABSTRACT

A message occurrence can be detected when a software application runs on a computing device. The message occurrence can be an occurrence where a text containing message is presented upon a user interface of the software application or a log associated with the software application is updated with a text containing message. A user context for the message occurrence can be determined. The user context can include a user sequence and an execution path. Message occurrence information can be conveyed to a message context catalog. Within the message context catalog, the message occurrence information can be indexed against unique message identifiers. Message occurrence information from the message context catalog can be presented in a computer's user interface when a message uniquely identified by the message identifier is presented in the user interface. The user interface can permit a user to edit text of messages.

20 Claims, 6 Drawing Sheets

(56) References Cited

U.S. PATENT DOCUMENTS

| | | | |
|---|---|---|---|
| 7,424,716 B1* | 9/2008 | Goswami et al. | 719/318 |
| 2001/0054091 A1* | 12/2001 | Lenz et al. | 709/221 |
| 2003/0020942 A1* | 1/2003 | Teres | 358/1.14 |
| 2004/0189460 A1* | 9/2004 | Heaton et al. | 340/500 |
| 2005/0188273 A1* | 8/2005 | Angelo et al. | 714/39 |
| 2006/0036991 A1 | 2/2006 | Biazetti et al. | |
| 2007/0083853 A1* | 4/2007 | Cook et al. | 717/120 |
| 2007/0260588 A1 | 11/2007 | Biazetti et al. | |
| 2009/0049428 A1* | 2/2009 | Cozmei | 717/128 |
| 2009/0052329 A1* | 2/2009 | Mahajan et al. | 370/242 |

\* cited by examiner

| Message number | Developer-written message | Final ID-written message based on Message Context Catalog |
|---|---|---|
| RALVMJ02E | Login failed. Contact System Administrator. | The user ID or password is incorrect. |
| RALVMJ03E | Login failed. Contact System Administrator. | This operator role is not authorized to perform this action. |

```
@Retention (RetentionPolicy.RUNTIME)                              500
public @interface Context {
        public enum Type {WebPage, PublicAPI, BackgroundThread,
Code};

/* The type of entry being added */
        Type type();

/* The description of the method from a user perspective */
        String description();

}
```

```
                                                                  510
Example usage:
@Context (type=Type.WebPage, description="Display logon webpage")
        public ActionForward logIntoWebPage(ActionMapping mapping,
ActionForm form,
HttpServletRequest request, HttpServletResponse response) throws
Exception {
```

```
                                                                  520
Example aspect definition:
public aspect TrackerHook {
        pointcut contextMethodCall(Context ctx) :
                execution(* *(..)) && @annotation(ctx);

before(Context ctx) : contextMethodCall(ctx) {
                ContextTrackerFactory.getTracker().pushContext(ctx);
        } after(Context ctx) : contextMethodCall(ctx) {
                ContextTrackerFactory.getTracker().popContext(ctx);
        }
}
```

FIG. 5

SOFTWARE DEVELOPMENT TOOL FOR PROVIDING USER CONTEXT INFORMATION TO IMPROVE MESSAGE QUALITY AT DEVELOPMENT TIME

BACKGROUND

The present invention relates to the field of software development, more particularly, to a software development tool for providing user context information to improve message quality at development time.

Poorly written software messages are a very common problem in the software industry, which results in messages with low usability. In many cases, messages (e.g., error messages) do not adequately describe the details of a software problem or the action that should be taken by the user/developer to resolve the problem. For example, messages presented to a user can include text for software error codes, can provide overly technical description of the problem, and can provide poorly translated messages.

From an end-user viewpoint, being presented with software messages ill suited for the user can be exceptionally frustrating. Such error messages are confusing to users attempting to decipher them, provide little guidance to users pertaining to steps that can be taken to resolve an error state and/or prevent it from reoccurring in the future, and generally have a detrimental effect on users' experience with a software application. Another problem with unintelligible error messages is that they do not provide system administrators, software maintainers, and other support personnel with sufficient information to take corrective actions.

An underlying reason that software messages often include difficult to decipher messages is inherent in the software message creation process itself. Software projects are typically decomposed into different discrete tasks or modules, which can be written by different development team members. Code messages are written by module specific developers and often include content tailored for that module. Code modules are tested and refined discretely and then integrated with each other. During integration, many messages are edited, modified, or even added. Besides the module developer, other developers and software testers working on the project also review the produced messages. Development can be cyclic, where module development, integration, and other testing repeat over multiple iterations.

From the above, it can be seen that the message creation process is largely a bottom-up one, where low-level code developers are responsible for the content of software messages that are to be presented to end users. These developers lack information about user context as it pertains to the messages, which are to be presented to and interpreted by end users. From an end-user perspective, messages are presented in a top-down manner. Thus, software messages are often presented to users that refer to low-level modules/concepts, which a typical user should not be expected to understand. This disconnectedness between the message intent and the message content is often a result of developers not having a proper user context for the user presented messages. Stated differently, a typical user is not exposed to (and is not overly concerned with) structural design considerations specific to internal logic that causes a software application to operate. An end-user is instead focused on accomplishing his or her goal through a sequence of interface interactions that are designed to result in the end-goal, which a developer creating user presented messages is often not fully aware of. There is a strong disconnect between these two different viewpoints, the message intent (the purpose of the message) and the message content (the information that is conveyed by the message.

A further challenge exists for software applications that support more than one natural language. Typically, software messages are converted from one language to another by translators who are at least bilingual. These messages are typically translated without context (or with an improper context), which can result in significant translation errors, which further diminishes an overall quality of the software messages. No known software development tools exist that present a message context to a developer/translator who is creating, editing, and/or translating software messages.

BRIEF DESCRIPTION OF THE SEVERAL VIEWS OF THE DRAWINGS

FIG. 5 illustrates sample code for enabling application code with user semantic annotations and later on tracking user context during execution flow for providing user context information to improve message quality of software applications in accordance with an embodiment of the inventive arrangements disclosed herein.

DETAILED DESCRIPTION

Figure 1A:
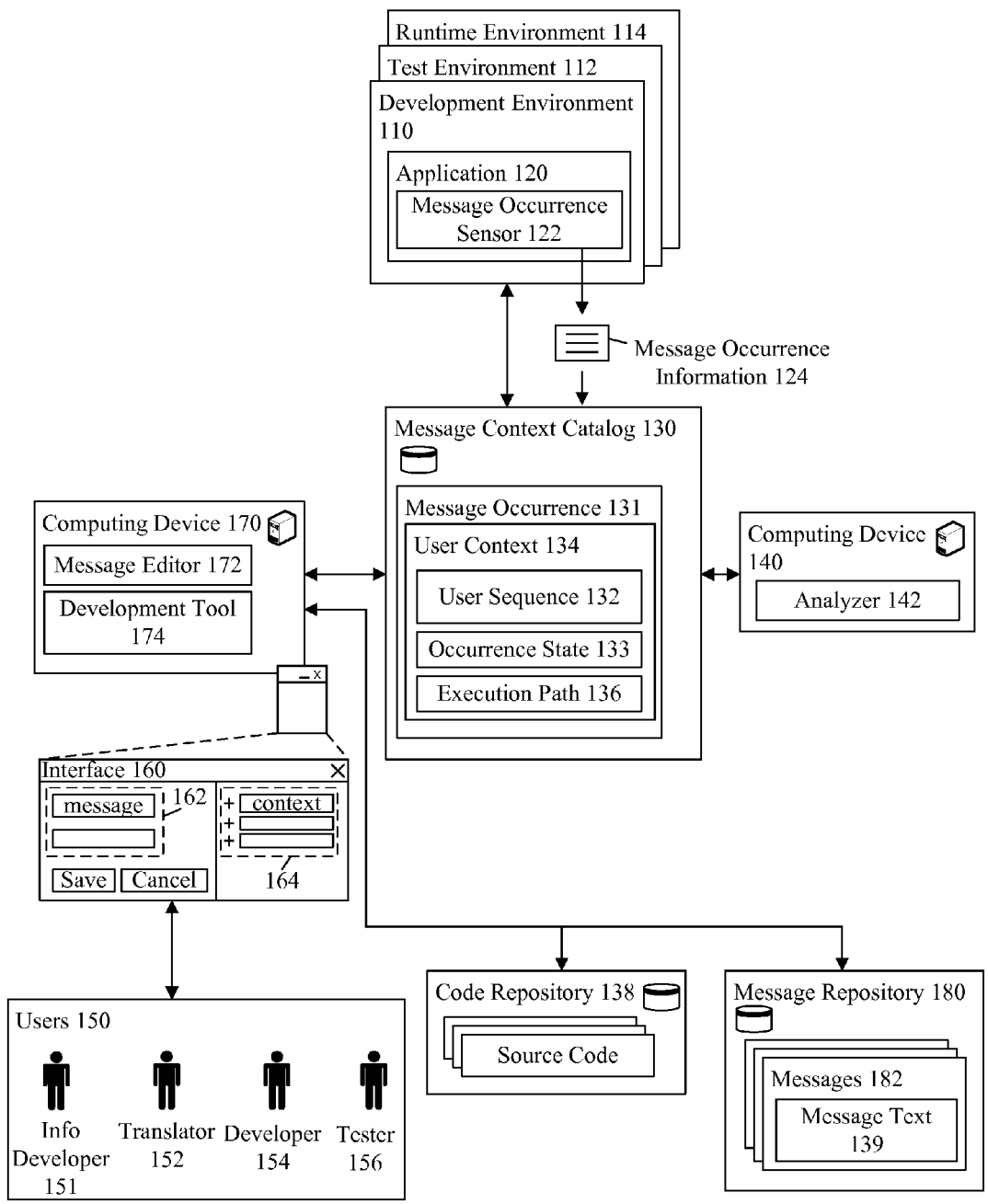
FIG. 1A is a flowchart illustrating a method for a software development tool for providing user context information to improve message quality at development time in accordance with an embodiment of the inventive arrangements disclosed herein.

The present invention discloses a solution for improving the quality of software messages at development time or translation time using a message context tool. A message context catalogue can be maintained that stores message identifiers and different message occurrences. Each of these occurrences can include a user context, associated with a user meaning of the occurrence. For instance, the user context can refer to an application state from a user perspective that resulted in the occurrence of the message. The user context can include, for example, a sequence of one or more user interface actions, which resulted in a message being presented. This information is typically not captured and stored in a data repository for developer use, as is the case with the disclosed solution. That is, an end-user perspective of occurrences where messages are presented to a user in a user interface (or where messages to be read by users are written to a log) is typically unknown to a software developer or translator who constructs the messages. Thus, it is common for user presented (or log written) messages to be written in a manner difficult for end-users to understand. The present solution tracks user context during an execution flow of an application, detects message occurrence events, captures and stores a user context, and correlates execution paths of code resulting in the message occurrence events to user context. The correlated user context is made available to developers responsible for message creation, which minimizes a disconnect between developers responsible for message content and users that digest and interpret the message content.

In one embodiment, a top-down depiction of the user context can include a set of user interface screens and user actions that resulted in a message occurrence. In one embodiment, the user context can include a user pattern, which is a sequence of user interactions leading to a message occurrence. In another embodiment, an execution path, which is a code execution sequence leading to a message occurrence, can also be maintained in the message context catalogue and correlated with the user context. In one embodiment, different filters can be established for the message context catalogue, such as only cataloging occurrences of designed message types, such as error, warning, and informational messages. In one embodiment, the message context catalogue can automatically be populated by message occurrences whenever these occurrences are triggered during any software development and/or testing phase of a software development lifecycle.

User context can be enabled and then tracked in many different software development environments, including a distributed environment, such as a Web based application development that includes support for Web services. A Web based application development environment can be particularly challenging because different portions of code can be executed by different distributed servers but they still belong to the same user context tracked on the same execution path. In a Web application environment, XML or other markup messages can be exchanged over a network. These messages can include metadata (e.g., a header section) that describes user context, execution path, and other data maintained by a message context catalogue. As Web software executes, it can write/update the metadata. Whenever a message occurrence is triggered, a final metadata update can be performed, and the metadata information can be automatically conveyed to a server, which maintains the message context catalogue. It should be appreciated that while the message context tool can be considered a developer tool, the inventive arrangements disclosed can be used to record production, runtime information in a message context catalog (as well as development/testing generated information), which can be used to improve message quality in subsequent software releases/software updates.

As will be appreciated by one skilled in the art, the present invention may be embodied as a system, method or computer program product tangibly stored in a physical medium. Additionally, any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1A is a schematic diagram of a system 100 for providing user context for software messages via a development tool in accordance with an embodiment of the inventive arrangements disclosed herein. In system 100, an application 120 can execute in a development environment 110, a test environment 112, and/or a runtime environment 114. Certain application states can result in a message occurrence 131, meaning a certain type of message is presented to a user and/or logged by a computing device executing the application 120. The message can include any content intended to be read and understood by an end-user, which includes error, warning, and informational messages. Message occurrence information 124 can be sent to a message context catalogue 130 when message occurrences are detected, where the information 124 can be indexed against a unique message identifier.

The message context catalogue 130 can be a storage space for digitally encoded information. For each unique message occurrence, a set of data can be stored, which includes user context 134 information. The user context information 134 is designed to characterize the message occurrence 131 from a user perspective. In one embodiment, user sequence data 132, occurrence state 133 data, and/or execution path 136 data can be maintained for each occurrence 131. Interface sequence data 132 records a sequence of user interactions with an interface, which resulted in the message occurrence 131. The occurrence state 133 comprises point-in-time application 120 details or an application "snapshot" existent at a time of the message occurrence 131. The execution path 136 can be the sequence of programmatic actions from an executable code perspective leading up to the message occurrence 131.

System 100 can continuously builds context 134 for different message occurrences 131 as application 120 executes and makes this context information available to a development team that is editing, reviewing, and translating those messages. The context information 134 can include a set of triggering occurrences that caused the software messages to be presented. For each occurrence 131, an execution path 136, a user sequence 132, and other information can be maintained. An execution path 136 can refer to a sequence of called and calling software routines that lead to an execution event, which resulted in the software message being presented. The user sequence 132 can be a set of user actions and/or user interface screens, which resulted in the event causing the software message to be presented. The user sequence 132 can include a set of user intent annotations, which are used to bridge a gap between a user's intent and resulting code that executes (e.g., the execution path 136). For instance, code annotations can be implemented within source code for application 120 to enable user intent to be derived from execution paths 136.

To elaborate, as application 120 executes, the user annotations (e.g., user context 134) described above are used by the context tracking system 100 to record user context flow through the application 120. Tracking of user context can be achieved by decorating methods of the application 120 that contain user context metadata to signal the context tracking component (message occurrence sensor 122) on entry and exit of the method. Decoration of the code can be achieved with an aspect-oriented approach that uses the annotated metadata as the anchor point. The tracking component (message occurrence sensor 122) processes entry and exits of user context data through the code from the initiation of a request through its completion, building a tree of the user context request path. To track threads of execution, the tracking component needs to be adapted to specific execution environments 110-114. For example, in a simple application, using thread ID may be sufficient for correlating the user contexts associated with a single request. For more complex application environments, integration with request context services may be used.

In one embodiment, an analyzer 142 executing on a computing device 140 can perform pattern analysis operations to discover if multiple message identifiers with the same message text (or semantic meaning) exist having similar user context 134, which would cause these different messages to be advantageously grouped to each other. Further, the analyzer 142 can determine if a message text for a single message should be split into multiple different context-dependent message texts based upon commonalities/differences and programmatic rules. For example, if a message identified as Message 1234 has one context relating to a mistyped password and another related to an unfound user identifier, message text can be varied/tailored based upon the different contexts.

A set of users 150 can interact with the message context catalogue 130 via a user interface 160 presented by a computing device 170. Different types of users 150 can include information developers 151, translators 152, software developers 154, and/or software testers 156, where specifics of the user interface 160 can change based upon implementation specifics and a type of user 150 interacting with the message context catalogue 130. Interface 160 can include some message editing (e.g., message editor 172) capabilities, shown by interface section 162. Interface 160 can also include a context interface section 164, which shows message occurrence information (e.g., data 132-136) for a presented message.

Depending upon implementation specifics, the user interface 160 may integrate message context catalogue 130 information with code repository 138 information. The code repository 138 information can be information tied to the source code of the application 120 and/or can be linked to message text 139 which is triggered when application 120 executes. In one embodiment, the message editor 172 functions can be integrated into a software development tool 174, such as an integrated design environment. In the embodiment development tool 174 can be a part of an Information Development Workbench.

In one embodiment, a user 150 manipulating message text 139 can lack permissions to access underlying code of the application 120. In the embodiment, message text 139 can be modified independent of application 120 source code. For example, a user 150 can be a translator 152 responsible to internationalizing software application 120 and/or for providing translations of messages of the application 120.

In system 100, the message context catalogue 130 can be communicatively linked to a network, which is also connected to environment 110-114, computing device 140, and/or computing device 170. This network can convey digitally encoded information within carrier waves using wired and/or wireless communication pathways. Each of the repositories/catalogues 130, 138, 180 can be storage spaces comprising storage hardware/media for digitally encoded data (e.g., hard drives, solid state drives (SSD), optical drives) and optionally including software and hardware for managing stored data (e.g., database software and/or machines upon which database software executes). Source code associated with application 120 can be one or more computer languages which can include, but is not limited to, C++, JAVA, and the like.

Application 120, sensor 122, analyzer 142, and entities 172-174 can be implemented as computer program products stored in a physical storage medium and able to be executed by computing devices upon which they reside. These computing devices, which include computing devices 140 and 170, can include, for example, a microprocessor, a volatile memory, and a nonvolatile memory linked via a bus. These computing devices can be general purpose machines executing computer program products within a general purpose operating system and/or can be special purpose machines tailored (via integrated electronics, firmware, and software) for a discrete set of computing functions. User interface 160 can be a graphical user interface (GUI), a text user interface (TUI), a voice user interface (VUI), a multimodal interface, and the like depending upon implementation choices.

The software messages and triggering events can include error messages and error conditions, but the invention is not so limited and the message context tool can be used for improving a development time quality of any type of software message that an end-user is intended to read. In one embodiment, the software message context development tool can function in a distributed environment, such as a Service Oriented Architecture (SOA) environment, a Web development environment, and the like. In such an environment, metadata can be added to code (e.g., markup code) to facilitate user context tracking.

Detection of a message can be achieved by sensor 122 which can monitor display components and/or message presentation components to identify when a message is presented. For instance, sensor 122 can be a log file handler able to detect a logging event. When a message is detected, the appropriate user context information 124 can be conveyed to context catalog 130.

Context catalog 130 can provide message occurrence 131 and/or user context 134 data for editor 172, and tool 174. Catalog 130 can index occurrence 131 information to enable access to any portion of user context 134 data. Catalog 130 can be continually updated by entities 110-114, 122 during the software execution and/or development; as such catalog 130 is progressively improved.

In one embodiment, message text 139 can be stored within message context catalog 130. In the embodiment, message text 139 can be updated by entities 172-174 through access to the context catalog 130. Alternatively, message text can be stored in code repository 138, where concurrent versioning system (CVS) tools can be used to apply modifications to message text 139.

Drawings presented herein are for illustrated purposes only and should not be construed to limit the invention in any regard. In system 100, analyzer 142 and repository 180 can be optional components. Application 120 can include standalone applications, Web services, and the like.

Figure 1B:
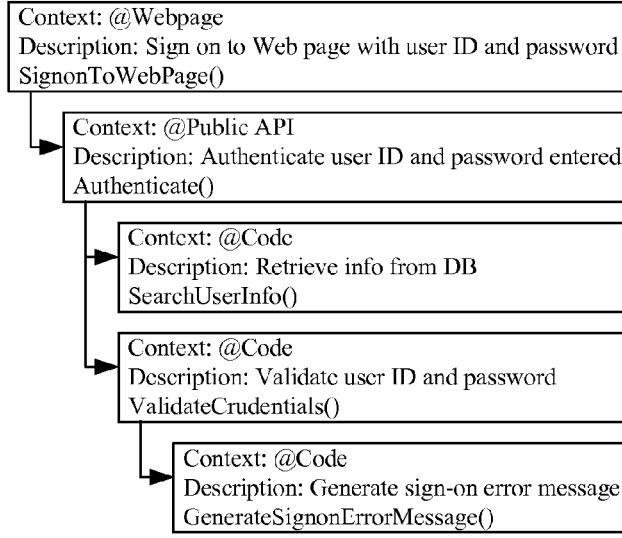
FIG. 1B shows an example of records in a message context catalog in accordance with an embodiment of the inventive arrangements disclosed herein.
Figure 1B:
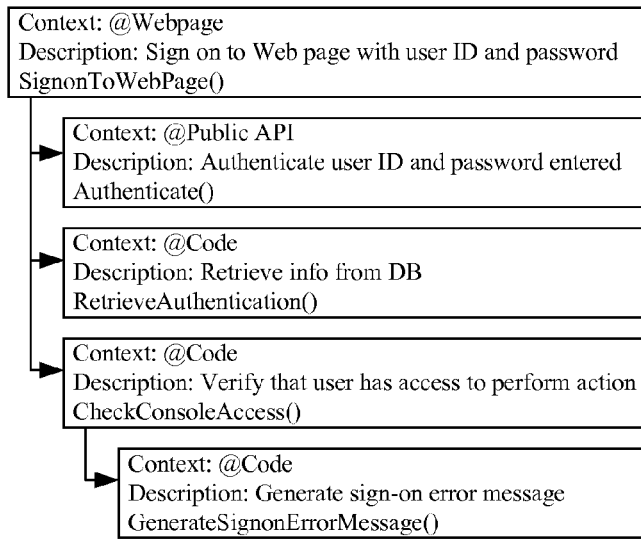

FIG. 1B shows an example of records 190, 194 of a message context catalog in accordance with an embodiment of the inventive arrangements disclosed herein. FIG. 1B provides an illustration of how messages are able to be developed and modified using the disclosed message editor 172, sensors 122, and message context catalog 130. Specifics of the records 190, 194 and table 198 are for illustrative purposes only and are not to be construed as limiting the scope of this disclosure.

Record 190, 194 represent two message occurrences, identified as RALVMJ02E and RALVMJ03E, respectively. Each record shows a user context correlated to an execution path. In both records 190, 194 a user has attempted to sign onto a Web page with a user ID and password. Both records 190, 194 ultimately trigger a message generated by execution of code "GenerateSignonErrorMessage( )." An original developer written message (shown in table 198) can be the same for both messages, RALVMJ02E and RALVMJ03E.

A developer exposed to the user context can determine a significant difference relevant to a user exists for the different message occurrences stored as records 190 and 194. Specifically, the message of record 190 is triggered when credential validation is attempted (e.g., ValidateCredentials( ) executes) while the message of record 194 is triggered when access verification is attempted (e.g., CheckConsoleAccess( ) executes). Armed with this user context information, which is typically not available, a software developer can customize the messages in a user comprehensible manner. As shown in table 198, a message associated with record 190 can be updated to state "The user ID or password is incorrect" and the message associated with record 194 can be updated to state "This operator role is not authorized to perform this action." These new messages when presented to a user will minimize user experienced confusion, which would likely result upon being presented with the original message. That is, a user reading the first message (RALVMJ02E) will know to reenter their user name and password and a user reading the second message (RALVMJ03E) will know that to access the Web page their permissions must be upgraded by a responsible system administrator.

Figure 2:
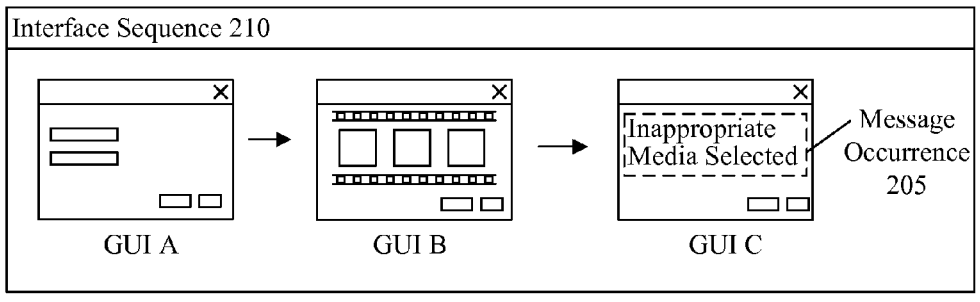
FIG. 2 is a schematic diagram illustrating a set of user context information for a software development tool providing user context information to improve message quality at development time in accordance with an embodiment of the inventive arrangements disclosed herein.
Figure 2:
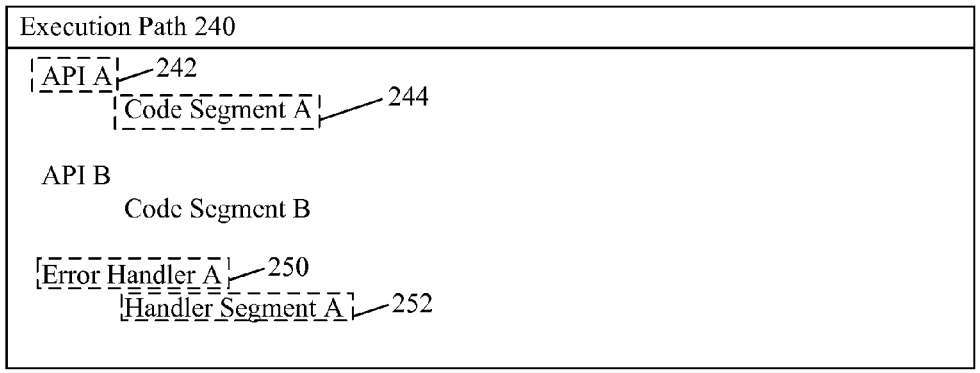

FIG. 2 is a schematic diagram illustrating a set of user context information for a software development tool providing user context information to improve message quality at design time in accordance with an embodiment of the inventive arrangements disclosed herein. User context information can be stored within a message context catalog (e.g., catalog 130) and accessed during message review. User context information can include metadata about application execution and message occurrence. The context information can include user sequence 210 and execution path 240.

Interface sequence 210 can include one or more interface artifacts presented to a user resulting in a message occurrence 205. In one embodiment, interface events can be tracked to determine user interaction for the context at the application state. For instance, determining which menu items and/or which buttons were selected by a user can be evaluated and associated with the user sequence 210 of user context. In another embodiment, screen captures can be stored during each interface state change. For instance, GUI A-C screenshots can be collected as a user navigates through a DVD creation process. In yet another embodiment, video capture of user interaction can be acquired and presented to message creators.

Occurrence ID 230 can be used to track message occurrences during application execution. Occurrence ID 230 can be used to reference user context for message occurrences. When an occurrence is detected, a unique identification (ID) value can be assigned to the message occurrence. The ID can be a globally unique ID such as a database ID, process ID, and the like. In one embodiment, thread ID can be utilized to identify message occurrences in multithreaded applications. For instance, message occurrence 205 can be indexed using a process ID or an internalized ID, as shown in section 232.

Code path 240 can include one or more sequences of programmatic actions from an executable code perspective leading up to the message occurrence 205. Code path 240 can include API calls, libraries, code segments, functions, and the like. Code path 240 can correspond to user sequences 210 or to transitions between interfaces. For instance, executable code 242, 244 can identify user context related to the executable code present in GUI A. In another instance, error handling code 250, 252 can provide user context for object oriented applications where execution paths can be handled by specialized code.

Figure 3:
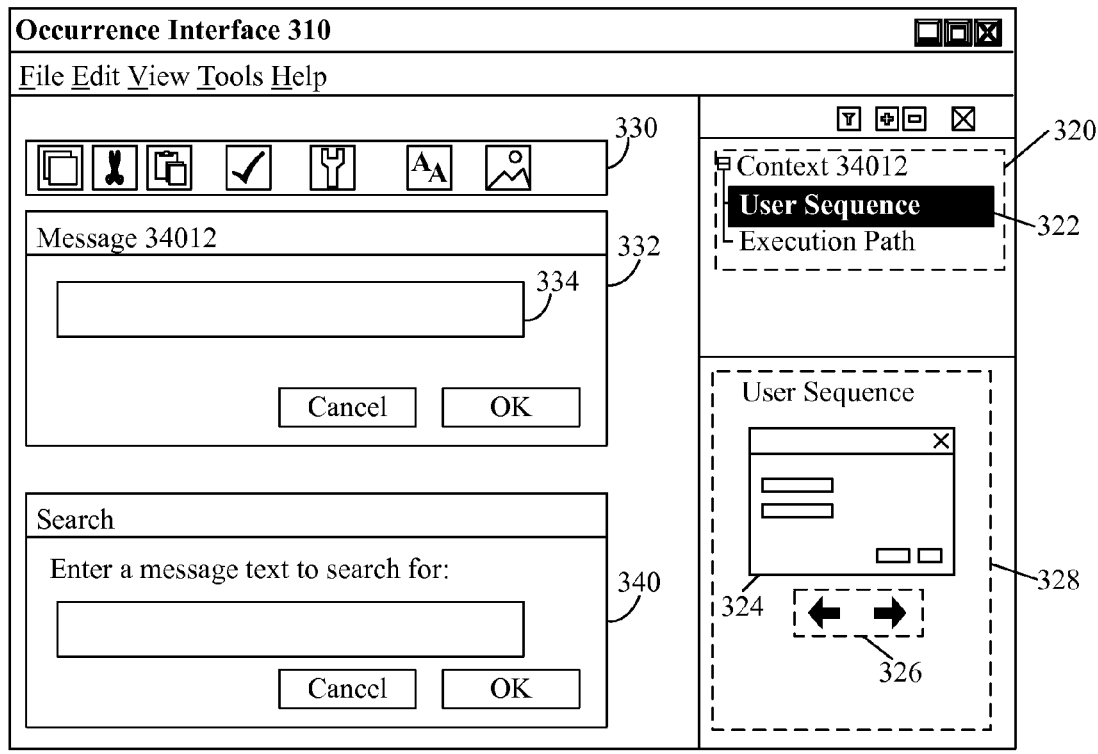
FIG. 3 is a schematic diagram illustrating an interface for a software development tool for providing user context information to improve message quality at design time in accordance with an embodiment of the inventive arrangements disclosed herein.

FIG. 3 is a schematic diagram illustrating an interface for a software development tool for providing user context information to improve message quality at design time in accordance with an embodiment of the inventive arrangements disclosed herein. In occurrence interface 310, messages can be presented with user context data enabling message authors to verify appropriate messages are presented to a user during software execution. For example, utilizing context data in section 320, message authors can improve the usability of messages by modifying the message to appropriately reflect the user intent. Interface 310 can be part of a software development tool such as an integrated development environment (IDE). User context interface information can be presented in section 328. Selection of elements within context 320 can be presented within section 328 which can be responsive to user interaction.

Interface 310 can enable message authors to review and modify messages in the presence of user context 320. Messages can be presented to authors in section 332, which can change for each type of message being reviewed. For instance, a log message normally written to a log file can be presented in section 332. Tools 330 can be utilized by authors to improve messages such as modifying message text presentation and message artifacts (e.g., images).

Section 328 can present context information including, but not limited to, user sequence and execution path. For instance, interface 324 can be presented simultaneously during message editing. Interface elements 326 can enable navigation through user sequences, enabling a message editor to view user context which triggered the message occurrence. For instance, buttons 326 can enable backwards and forwards navigation through the context of a message occurrence.

Section 340 can be used by message editors to search for keywords in messages occurrences. With search functionality, message editors can identify groups of message occurrences which relate to user context, enabling editors to maintain message consistency. Further, search functionality can permit searching by user sequence element, execution path element, and the like allowing editors to access message occurrences by any user context criteria.

Annotation information can be optionally presented in section 328 of interface 310. Header information can be selectively suppressed based on user configuration of interface 310. Annotation description text can be presented in section 328 for each point in the execution path. For example, an execution path having five annotations can be presented in a set of sequential dialogs (e.g., wizard dialog) enabling authors to obtain detailed user context information.

Drawings presented herein are for illustrative purposes only and should not be construed to limit the invention in any regard. Interface 310 can comprise of one or more user interface elements which can be selectively presented based on user permissions. For instance, interface elements can be suppressed when users are only permitted to view messages. Interface 310 can be a stand-alone executable tool utilized during software development such as debugging/testing, quality assurance, and deployment phases.

Interface 310 can include common IDE features not shown in the interface. Additional features which can assist in the message creation process can include adding comments to a message occurrence. For example, reviewers who do not have permissions to edit notification messages can attach comments/notes to the message occurrences which can be presented to authors, editors, and developers using the interface 310. Interface 310 can include a local history/change log which can help authors track changes performed between sessions.

Figure 4:
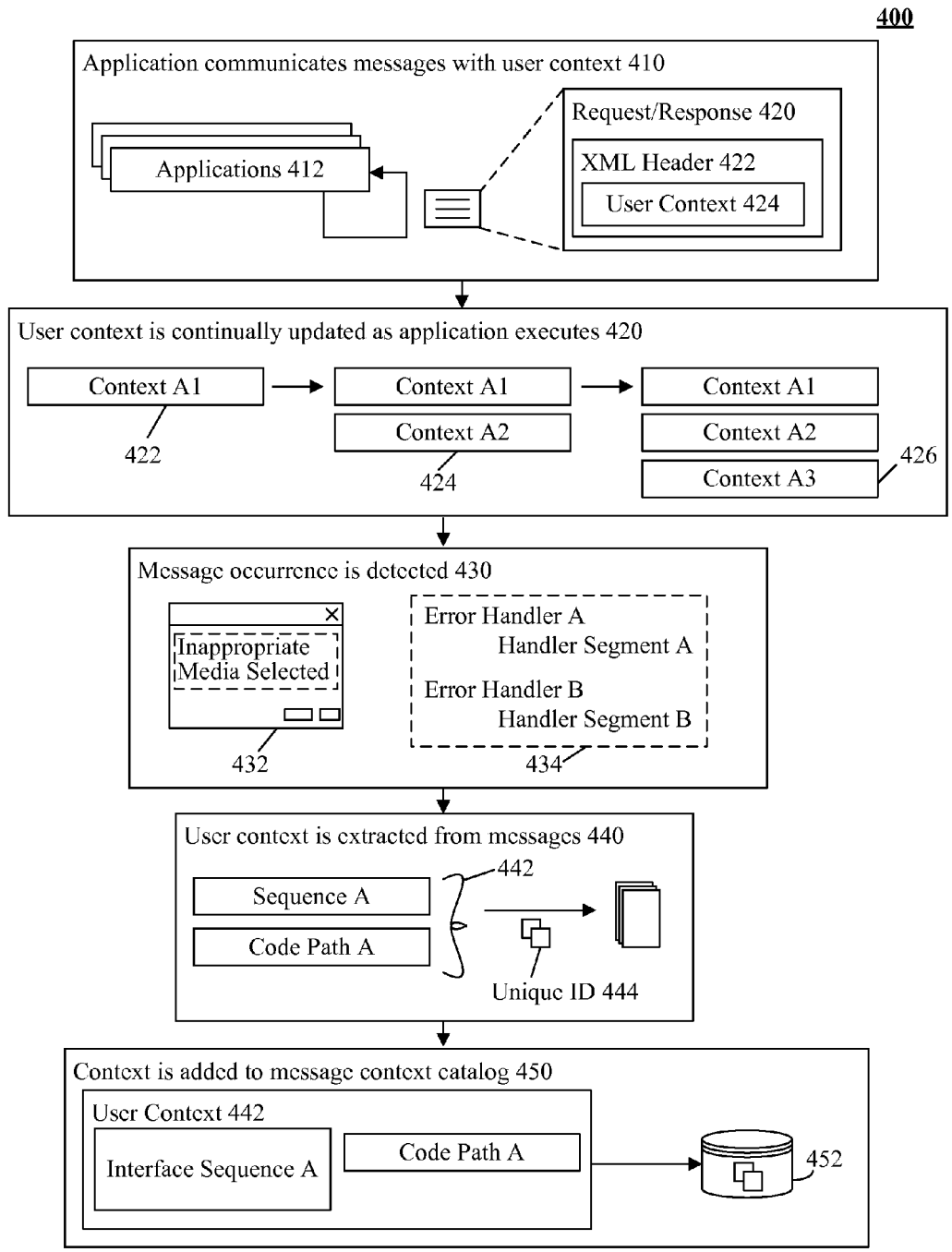
FIG. 4 is a schematic diagram illustrating a flow for a software development tool for providing user context information to improve message quality at design time in accordance with an embodiment of the inventive arrangements disclosed herein.

FIG. 4 is a schematic diagram illustrating a flow for a software development tool for providing user context information to improve message quality at design time in accordance with an embodiment of the inventive arrangements disclosed herein. In flow diagram 400, actions 410-450 enable user context tracking to be performed within a distributed computing environment (e.g., Web based environment).

Unlike traditional runtime environments, Web based environments such as Service Oriented Architectures can be problematic to perform tracing. This is a result of the distributed architecture resulting in disparate code segments (e.g., services) communicating in an ad-hoc manner. The ability to track execution path becomes further complicated when services are loosely coupled. To address these scenarios, user context can be associated with service response/requests. In one embodiment, Extensible Markup Language (XML) headers associated with application communication can include user context information.

In action 410, applications can communicate messages with user context embedded within the header and/or message body. As applications 412 communicate request/response messages, user context 424 can be encoded within XML header 422. User context 424 can be XML data indicating user sequence information, execution paths, application state, and the like.

In action 420, user context can be continually updated as applications execute. During an initial request, initial context 422 can be established, which can include application programming interface (API) entry points, request parameters, and the like. As the application state changes, additional context 424 can be amended to the user context. Context can be continually updated until a message occurrence is detected. When a message occurrence is detected, context 426 is appended to indicate user context at the message occurrence.

In action 430, message occurrence can be detected in a variety of manners compliant with distributed environments. In one instance, message occurrence can be determined when a Web page 432 is requested/delivered. Alternatively, error handling code and/or services 434 can be monitored to determine when a message occurrence is triggered.

In action 440, user context 442 can be extracted from communication messages. This action can be performed by an user context extraction tools. User context can be assigned a unique ID 444 based on response/request ID, Web server thread ID, port number, and the like.

In action 450, user context 442 can be added to a message catalog containing other user contexts for message occurrences. The catalog 452 can index the user context using one or more parameters, which can include a message occurrence ID.

Actions 410-450 can be repeated for each message occurrence detected. Stored messages in catalog 452 can be improved by message editors and reintroduced into process 400, allowing messages to continually be improved throughout the development process.

FIG. 5 illustrates sample code 500, 510, 520 for enabling application code with user semantic annotations and later on tracking user context during execution flow for providing user context information to improve message quality of software applications in accordance with an embodiment of the inventive arrangements disclosed herein. The sample code adds user context tracking to a J2EE Web application, which contains both HTML components and EJB Server/DB components. Specifics shown in the code 500-520 are for illustrative purposes only and are not to be construed as limiting scope of the claimed invention.

Code 500 shows metadata with user semantic ("description" tag in the example) being added to methods by creating a JAVA Annotation for context tracking. Code 510 shows an example usage of code 500.

Once metadata is added to methods, user context must still be tracked during execution flow. Code 520 shows a simple tracking component that uses thread ID to correlate user contexts with the same request. The tracking component is informed of entry and exit methods with the "Context" annotation by using AspectJ to decorate the methods.

Code 520 implements a tracking component that records user contexts in a tree structure, which allows for tracking of the nesting structure. It should be noted that a root request may be forwarded to multiple page handlers before a response is sent back to the client, in the code above, which poses an additional challenge to the Web application tier. This challenge can be overcome by adding a servlet filter to the Web application to initiate the context for a request received from a user's Web browser. Although thread ID was used in the code 520, other solutions exist. For example, a more robust solution in a J2EE environment is to use services, such as the WEBSPHERE WORK AREA SERVICE, so that tracking continues across EJB calls, etc.

In the example based on code 500-520, multiple avenues can exist for displaying a message. These avenues include message logging, displaying of a full page error message, and displaying of an in-line error message. Each of these messages occurrences need to be detected by a message occurrence sensor.

To detect messages being logged into a file, a JAVA log API Handler can be implemented that triggers sending information to a correlation component (e.g., a local queue that intermittently sends message occurrence information to a message context catalog, the message context catalog itself, etc.), which thereafter passes the relevant messages to an existing log handler implementation. In the case of displaying a full page error message, a tag library used to display an error message can be updated to send message ID and user context information to the correlation component. In the case of displaying an in-line message, a tag library used to display the error message can be updated to send message ID and user context information to the correlation component. These are just a few possible message avenues and detection mechanisms, which are provided for illustrative purposes, and which are not intended to be comprehensive or interpreted in a manner that limits the scope of the claims.

It should be noted that once message occurrence information has been placed in the correlation component, message ID, message code, usage patterns, execution paths, occurrence state, and user sequence will have to be correlated or indexed with each other. In one embodiment, this can be accomplished using a database schema established for this purpose, which can be maintained by the message context catalog. In another embodiment, file based indexing schemes (as opposed to using a pure database) can be used to correlate this information. Any indexing techniques for data correlation can be used herein and the invention is not to be construed as limited in this regard.

The diagrams in the FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for improving software messages comprising:
    detecting a message occurrence when a software application runs in a run-time environment on a computing device for an end-user utilizing the software application, the message occurrence being responsive to one or more end-user interactions with an interface of the software application and being an occurrence selected from a group of occurrences consisting of an occurrence where a text containing message written by a developer or translator is presented upon a user interface of the software application to the end-user and an occurrence where a text containing message is written to a log associated with the software application, wherein the text containing message presented upon the user interface and the text containing message written to the log includes text content readable by the end-user, wherein the user interface permits the end user to edit the text containing message;
    determining a user context for the message occurrence, wherein said user context comprises a user sequence performed by the end-user using the software application in the run-time environment and an execution path performed by the software application executing for the end-user; and
    conveying message occurrence information for the determined user context over a network connecting the computing device to a message context catalog that is remotely located from the computing device, wherein the message context catalog comprises storage hardware for digitally encoded information, wherein the message occurrence information is indexed in the message context catalog against unique message identifiers, wherein the information in the message context catalog is accessible by developers or translators, via devices remotely located from the computing device, wherein the developers or translators construct future versions of the text content for future versions of the software application.

2. The method of claim 1, further comprising:
    presenting message occurrence information from the message context catalog that is indexed against a message identifier in a computer interface presented to a developer or translator when a message uniquely identified by the message identifier is presented in the computer interface, said computer interface permitting the developer or translator edit text of the message uniquely identified by the message identifier.

3. The method of claim 1, wherein the user context comprises an ordered sequence of a plurality of user sequence elements and wherein the execution path comprises an ordered sequence of a plurality of execution path elements, said method further comprising:
    tracking user context during an execution flow of the software application; and
    correlating each user sequence element to a specific one of the execution path elements.

4. The method of claim 1, wherein the user context applies user semantics to execution paths of code of the software application.

5. The method of claim 1, further comprising:
    adding user context information to code of the software application as the software application runs in the run-time environment on the computing device for the end-user, wherein determining user context for the message occurrence comprises extracting the added user context information from the code.

6. The method of claim 1, wherein at least a portion of the user context is generated from source code annotations, which are selectively enabled or disabled depending upon a source code specified user context enablement parameter.

7. The method of claim 1, wherein the user sequence comprises an ordered sequence of user interface screens, said interface screens comprising a plurality of ordered screens presented to the end user immediately before the message occurrence was detected, wherein the data specifying the ordered sequence is sufficient to enable the ordered sequence of user interface screens to be replicated at a later time in a form in which the interface screens existed when the software application was running in the run-time environment.

8. The method of claim 1, wherein the execution path comprises a sequence of code executions for code of the software application leading up to the message occurrence, said execution path comprising API calls, function calls, library calls, and code segments executed.

9. The method of claim 1, wherein the software application is a distributed application running in a heterogeneous computing environment comprising at least one Web service, wherein XML based messages are conveyed among components of the software application as the software application runs, wherein data needed to construct user context in an event of a message occurrence spans multiple different components of the software application, each of which execute independently of each other, wherein the XML based message comprise XML header information comprises data for at least a portion of the user context, wherein said user context data in the XML header information is utilized to determine the user context for the message occurrence.

10. The method of claim 1, further comprising:
analyzing data stored in the message context catalog for patterns in the usage context information and texts of messages having unique message identifiers in the message context catalog to detect potential problems with messages of the software application to be addressed by developers during a software development phase of the software application.

11. A computer program product for improving software messages, the computer program product comprising:
a non-transitory computer usable medium having computer usable program code embodied therewith, the computer usable program code comprising:
computer usable program code configured to detect a message occurrence when a software application runs in a run-time environment on a computing device, the message occurrence being responsive to one or more user interactions with an interface of the software application and being an occurrence selected from a group of occurrences consisting of an occurrence where a text containing message written by a developer or translator is presented upon a user interface of the software application and an occurrence where a text containing message is written to a log associated with the software application, wherein the text containing message presented upon the user interface and the test containing message written to the log includes text content readable by the user, wherein the user interface permits the user to edit the text containing message;
computer usable program code configured to determine a user context for the message occurrence, wherein said user context comprises a user sequence performed by the end-user using the software application in the run-time environment and an execution path performed by the software application executing for the user; and
computer usable program code configured to convey message occurrence information for the determined user context over a network connecting the computing device to a message context catalog, that is remotely located from the computing device, wherein the message context catalog comprises storage hardware for digitally encoded information, wherein the message occurrence information is indexed in the message context catalog against unique message identifiers, via devices remotely located from the computing device, wherein the developers or translators, wherein the information in the message context catalog is accessible by developers or translators.

12. The computer program product of claim 11, further comprising:
computer usable program code configured to present message occurrence information from the message context catalog that is indexed against a message identifier in a computer interface presented to a developer or translator when a message uniquely identified by the message identifier is presented in the computer interface, said computer interface permitting the developer or translator edit text of the message uniquely identified by the message identifier.

13. The computer program product of claim 11, wherein the user context comprises an ordered sequence of a plurality of user context elements and wherein the execution path comprises an ordered sequence of a plurality of execution path elements, said computer program product further comprising:
computer usable program code configured to track user context during an execution flow of the software application; and
computer usable program code configured to correlate each user sequence element to a specific one of the execution path elements.

14. A system for providing user context information to improve quality of messages of a distributed software application comprising:
computer code product stored on a physical medium and executable by a processor configured to capture user context comprising user semantic information during execution flow of a software application running in a runtime environment for a user and configured to annotate software application code to include the captured user context, wherein a user interface permits the user to edit the text containing message;
at least one message occurrence sensor comprising software stored on a physical medium and executable by a processor for detecting message occurrences when the software application executes, the message occurrences being responsive to one or more user interactions with an interface of the software application running in the runtime environment and being a text containing message including text content readable by a user, for gathering user context data for each message occurrence from the annotations of the software application code,
wherein the message occurrences represent an occurrence of an error message written by a developer or translator being presented to the user via a user interface of the software application and for conveying message occurrence information comprising the gathered user context data to a message context catalog; and
a message context catalog comprising hardware for storing digitally encoded data, said digitally encoded data comprising message occurrence information from the message occurrence sensor indexed against unique message identifiers, wherein the message context catalog is remotely located from the computing device, wherein the message context catalog wherein the digitally encoded data in the message context catalog is accessible by developers or translators, via devices remotely located from the computing device.

15. The system of claim 14, wherein said user context data comprises an ordered sequence of a plurality of user sequence elements and wherein the execution path comprises an ordered sequence of a plurality of execution path elements, said message context catalog correlating each user sequence element of the ordered sequence of user content context elements to a specific one of the execution path elements for each unique message identifier.

16. The system of claim 14, further comprising:
a message editor comprising software stored in a physical medium and executable by a processor, said message editor for editing content of text messages of the software application via a message editing user interface for developers or translators; and
said message editing user interface of the message editor comprising an interface element for displaying a unique message of the software application, an interface element for modifying text of the unique message, and at least one interface element for presenting said message occurrence information from the message context catalog that is associated with the unique message displayed in the associated interface element of the message editing user interface.

17. The system of claim 14, said software application is a distributed application comprising a plurality of discrete computer code products running on different computing devices remotely located from each other and connected via a computing network, wherein the message context catalog is remotely located from the different computing devices and is communicatively linked to said computing network, wherein user context data comprises data from executions of a plurality of different ones of the computer code products running on different computing devices.

18. The system of claim 14, wherein the user context data comprises user sequence data and execution path data, wherein the user sequence data is correlated to the execution path data in the message context catalog.

19. The system of claim 15, wherein the message editor is a component of a software development tool, wherein the message editing interface comprises interface elements for editing source code of the software application, wherein said source code is indexed against the message occurrences so that said user context data is presented in the message editing interface proximate to source code sections comprising an identifier to a message to which the message occurrence data relates when the source code sections are presented in the message editing interface.

20. The system of claim 15, wherein the message editing interface is an interface utilized by translators responsible for converting message text of the software application from one national language to another, wherein said translators lack direct access to source code of the software application.

* * * * *